(12) United States Patent
Harashina et al.

(10) Patent No.: US 7,169,836 B2
(45) Date of Patent: Jan. 30, 2007

(54) FLAME-RETARDANT RESIN COMPOSITION

(75) Inventors: Hatsuhiko Harashina, Fuji (JP); Shinya Yamada, Fuji (JP); Yuji Tada, Tokushima (JP)

(73) Assignee: Polyplastics Co., Ltd, Tokyo (JP)

( * ) Notice: Subject to any disclaimer, the term of this patent is extended or adjusted under 35 U.S.C. 154(b) by 0 days.

(21) Appl. No.: 10/477,598

(22) PCT Filed: Jun. 27, 2002

(86) PCT No.: PCT/JP02/06460

§ 371 (c)(1),
(2), (4) Date: Nov. 13, 2003

(87) PCT Pub. No.: WO03/002666

PCT Pub. Date: Jan. 9, 2003

(65) Prior Publication Data

US 2004/0147646 A1    Jul. 29, 2004

(30) Foreign Application Priority Data

Jun. 27, 2001    (JP) .......................... 2001-195170

(51) Int. Cl.
*C08K 5/5399*    (2006.01)
(52) U.S. Cl. ..................... 524/116; 524/122; 524/138; 524/148

(58) Field of Classification Search ................ 524/116, 524/138, 148, 122
See application file for complete search history.

(56) References Cited

U.S. PATENT DOCUMENTS

| | | | |
|---|---|---|---|
| 6,518,336 B1 * | 2/2003 | Yabuhara et al. | 524/116 |
| 6,790,886 B1 * | 9/2004 | Harashina et al. | 524/116 |
| 2004/0254270 A1 * | 12/2004 | Harashina | 524/86 |
| 2005/0004292 A1 * | 1/2005 | Harashina et al. | 524/430 |

FOREIGN PATENT DOCUMENTS

| | | |
|---|---|---|
| EP | 945478 | 9/1999 |
| JP | 8-302124 | 11/1996 |
| JP | 10-077396 | 3/1998 |
| JP | 10-168297 | 6/1998 |
| JP | 10-195283 | 7/1998 |
| JP | 11-181268 | 7/1999 |
| JP | 11-181429 | 7/1999 |
| JP | 2000-212412 | 8/2000 |
| WO | WO 00/09518 | 2/2000 |

* cited by examiner

*Primary Examiner*—Peter Szekely
(74) *Attorney, Agent, or Firm*—Nixon & Vanderhye, P.C.

(57) ABSTRACT

A flame retardant comprising a phosphazene compound, a polyphenylene oxide-series resin, and if necessary a styrenic resin and/or a nitrogen-containing compound imparts flame retardancy to a polyalkylene arylate-series resin. The phosphazene compound comprises at least a crosslinked phenoxyphosphazene compound. The obtained polyalkylene arylate-series resin composition shows high flame-retardancy.

10 Claims, No Drawings

FLAME-RETARDANT RESIN COMPOSITION

This application is the US national phase of international application PCT/JP02/06460 filed 27 Jun. 2002 which designated the U.S.

TECHNICAL FIELD

The present invention relates to a flame-retardant resin composition comprising a polyalkylene arylate-series resin and a process for producing the same, and a shaped article formed with the flame-retardant resin composition.

BACKGROUND ART

A polyalkylene terephthalate resin such as a polybutylene terephthalate has excellent mechanical and electrical properties, weather resistance, water resistance, and resistance to chemicals and solvents. Such a resin is, therefore, used as an engineering plastic in various purposes such as electric or electronic device parts, mechanical device parts and automotive parts. While, the resin is required to be flame-retardant from viewpoint of safety as the field of their uses expands. In general, there is known a method for rendering a resin flame-retardant by adding a halogen-series flame retardant composed of a halogen-series (halogen-containing) compound or a halogen-series compound in combination with an antimony-series (antimony-containing) compound to the resin. However, the halogen-series flame retardant is not preferable for environmental reasons because the flame retardant sometimes generates a large amount of a dioxin-series compound on resolution caused by combustion. Therefore, there is proposed a method for rendering the polyester-series resin flame-retardant by using a phosphorus-series (phosphorus-containing) compound as a halogen-free flame retardant.

Japanese Patent Application Laid-Open No. 168297/1998 (JP-10-168297A) discloses a flame-retardant resin composition comprising a thermoplastic polyester resin, a polycarbonate-series resin, and an organic phosphorus-series (phosphate-series) flame retardant. Japanese Patent Application Laid-Open No. 195283/1998 (JP-10-195283A) discloses a polyester resin composition to which flame retardancy is imparted with the combination use of a phosphoric ester having a specific structure, a novolak-based phenol resin, and an oxide of a specific metal (such as iron, cobalt, nickel or copper) in an adequate amount. Japanese Patent Application Laid-Open No. 212412/2000 (JP-2000-212412A) discloses a flame retardant resin composition comprising a thermoplastic polyester resin, a vinyl-series resin, an organic phosphorus-series flame retardant (such as a condensed phosphoric ester) and a glass fiber. The phosphoric ester-series flame retardant does not comprise harmful halogens; however, the flame retardant is inferior to a halogen-series flame retardant in flame retardancy, so that it is necessary to add a large amount of the flame-retardant. The addition of a large amount of the flame-retardant brings about bleeding out (blooming) and deteriorating in mechanical properties of a resin. It is, therefore, impossible to improve both flame retardancy, and mechanical properties.

Moreover, Japanese Patent Application Laid-Open No. 181268/1999 (JP-11-181268A) discloses that addition of 1.5 to 15 parts by weight of a phosphazene compound and 0.5 to 30 parts by weight of a talc and/or mica to 100 part by weight of a resin mixture containing an aromatic polycarbonate-series resin and a thermoplastic polyester-series resin in a ratio (weight ratio) of 90/10 to 50/50 [the former/the latter] can impart flame retardancy to the resin mixture. However, such an aromatic polycarbonate-based resin composition has a problem in resistance to solvents. In addition, melt-flowability of the resin composition is deteriorated upon a molding process, and moldability (formability) thereof is adversely affected.

Incidentally, Japanese Patent Application Laid-Open No. 181429/1999 (JP-11-181429A) discloses impartment of flame retardancy to either a thermoplastic resin (such as a polyethylene terephthalate, a polybutylene terephthalate and a polycarbonate) or a thermosetting resin (such as a phenolic resin) by using a specific phosphazene compound (e.g., a cyclic phosphazene compound, a linear phosphazene compound, a crosslinked phosphazene compound formed by crosslinking the cyclic and/or the linear phosphazene compound(s) with a specific group) as a flame retardant. However, in the case where flame retardancy is imparted to a polyethylene terephthalate or a polybutylene terephthalate, satisfactory flame retardancy cannot be imparted thereto with the phosphazene compound alone.

It is therefore an object of the present invention to provide a flame-retardant resin composition being rendered flame-retardant to a high level without deteriorating properties of a polyalkylene arylate-series resin, and a process for producing the same.

It is another object of the invention to provide a flame-retardant resin composition in which bleeding out of a flame retardant is inhibited, no metal corrosion occurs, and moldability is excellent, and to which high flame-retardancy is imparted, as well as a shaped (or molded) article formed with the composition.

DISCLOSURE OF INVENTION

The inventors of the present invention made intensive studies to achieve the above objects and finally found that combination use of at least a phosphazene compound and a polyphenylene oxide-series resin as a flame retardant ensures impartment of high flame-retardancy to a polyalkylene arylate-series resin without deterioration of mechanical properties, extensively suppresses bleeding out of the flame retardant from a shaped article, and improves metal corrosion, and moldability in an injection molding. The present invention was accomplished based on the above findings.

That is, the flame-retardant resin composition of the present invention comprises a flame retardant and a polyalkylene arylate-series resin (e.g., a polyethylene terephthalate-series resin, a polybutylene terephthalate-series resin), and the flame retardant comprises a specific phosphazene compound and a polyphenylene oxide-series resin. The phosphazene compound comprises at least a crosslinked phenoxyphosphazene compound in which at least one phenoxyphosphazene compound selected from the group consisting of a cyclic phenoxyphosphazene compound represented by the following formula (1) and a linear phenoxyphosphazene compound represented by the following formula (2) is crosslinked with the following crosslinking group:

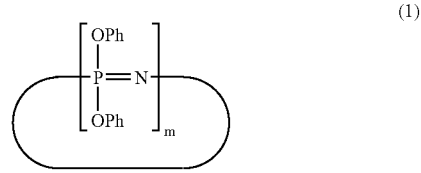

wherein m denotes an integer of 3 to 25, and Ph represents a phenyl group;

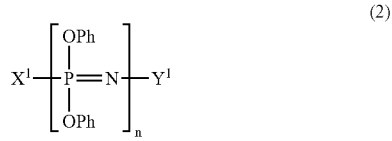

wherein $X^1$ represents the group —N=P(OPh)$_3$ or the group —N=P(O)OPh, $Y^1$ represents the group —P(OPh)$_4$ or the group —P(O)(OPh)$_2$, n denotes an integer of 3 to 10,000, and Ph has the same meaning as defined in the formula (1); and the crosslinking group comprising at least one member selected from the group consisting of o-phenylene group, m-phenylene group, p-phenylene group, and a bisphenylene group represented by the formula (3)

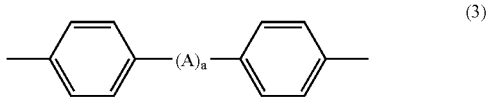

wherein A represents —C(CH$_3$)$_2$—, —SO$_2$—, —S— or —O—, and a denotes 0 or 1; and wherein the crosslinking group is bonded to two oxygen atoms with elimination of phenyl groups of the phenoxyphosphazene compound(s), and the content of the phenyl group of the crosslinked compound is, based on the total phenyl groups in at least one phosphazene compound selected from the group consisting of the phosphazene compounds (1) and (2), 50 to 99.9 mol %, and the crosslinked phenoxyphosphazene compound is free from a free hydroxyl group.

The phosphazene compound may further comprise the cyclic phenoxyphosphazene compound (1), the linear phenoxyphosphazene compound (2), and others.

In the flame retardant, the amount of the polyphenylene oxide-series resin may be about 10 to 500 parts by weight relative to 100 parts by weight of the phosphazene compound. The flame retardant may further comprise a styrenic resin, a nitrogen-containing compound, and others. The amount of the flame retardant is about 5 to 300 parts by weight relative to 100 parts by weight of the polyalkylene arylate-series resin. The flame retardant may further comprise a phosphorus-series compound, a carbonizable resin, an inorganic metal compound, and others. The resin composition of the present invention may further comprise an antioxidant, a dripping inhibitor, a releasing agent, a filler, and others.

The present invention also includes a process for producing a flame-retardant resin composition, which comprises mixing a polyalkylene arylate-series resin with the flame retardant. Moreover, the present invention includes a shaped article formed with the above-mentioned composition.

BEST MODE FOR CARRYING OUT THE INVENTION

[Polyalkylene arylate-series Resin]

The polyalkylene arylate-series resin includes a homopolyester or copolyester of an alkylene arylate (e.g., an alkylene terephthalate) as a main component (for example, about 50 to 100% by weight, and preferably about 75 to 100% by weight). The homopolyester includes, for example, a poly(1,4-cyclohexane dimethylene terephthalate) (PCT), a polyethylene terephthalate (PET), a polypropylene terephthalate (PPT), a polybutylene terephthalate (PBT), a polyethylene naphthalate (PEN), a polypropylene naphthalate (PPN), and a polybutylene naphthalate (PBN). As a copolymerizable monomer constituting the copolyester, there may be mentioned an alcohol component such as a (poly)ethylene glycol, a (poly)trimethylene glycol, a (poly)propylene glycol, a (poly)butylene glycol, 1,6-hexanediol, and 1,4-cyclohexanedimethanol; a carboxylic acid component such as an aliphatic dicarboxylic acid (e.g., adipic acid, sebacic acid, decanedicarboxylic acid), an aromatic dicarboxylic acid (e.g., isophthalic acid, naphthalenedicarboxylic acid, biphenylenedicarboxylic acid), and a hydroxycarboxylic acid (e.g., hydroxybenzoic acid, hydroxynaphthoic acid); a phenol component such as hydroquinone, resorcinol, and biphenol; a dihydroxy component such as an alkylene oxide adduct of a dihydric phenol component [e.g., bis(2-hydroxyethoxy)benzene, bis[4-(2-hydroxyethoxy)phenyl]propane]; and others. The polyalkylene arylate-series resin(s) may be used singly or in combination.

The preferred polyalkylene arylate-series resin includes a polyethylene terephthalate-series resin, a polypropylene terephthalate-series resin, a polybutylene terephthalate-series resin, and the like. In particular, preferred is a polyC$_{2-4}$alkylene terephthalate (such as a polyethylene terephthalate and a polybutylene terephthalate), a copolyester (for example, a polyC$_{2-4}$alkylene terephthalate/isophthalate copolymer) such as a polybutylene terephthalate/isophthalate copolymer which comprises isophthalic acid and the like as a copolymerizable component.

The number average molecular weight of the polyalkylene arylate-series resin is not particularly limited, and for example, may be selected within the range of about $5 \times 10^3$ to $100 \times 10^4$, preferably about $1 \times 10^4$ to $70 \times 10^4$, and more preferably about $1.2 \times 10^4$ to $30 \times 10^4$.

The polyalkylene arylate-series resin can be produced by a conventional manner, for example, transesterification with the use of an alkylene glycol, and an aromatic dicarboxylic acid or an ester thereof (e.g., terephthalic acid or dimethyl terephthalate, and isophthalic acid or dimethyl isophthalate as a copolymerizable component), or direct esterification.

[Flame Retardant]

The flame retardant of the present invention comprises a specific phosphazene compound and a polyphenylene oxide-series resin. The flame retardant may comprise the phosphazene compound, the polyphenylene oxide-series resin, and if necessary, a styrenic resin and/or a nitrogen-containing compound. Use of such a flame retardant ensures high flame-retardancy in a polyalkylene arylate-series resin without deteriorating mechanical properties. Further, in the present invention, the flame retardant can inhibit deterioration of mechanical properties specially without using a compatibilizing agent.

(Phosphazene Compound)

The phosphazene compound includes a cyclic phenoxyphosphazene compound, a linear phenoxyphosphazene compound, a crosslinked phenoxyphosphazene compound, and the like. In the present invention, the phosphazene compound comprises at least a crosslinked phenoxyphosphazene compound.

The cyclic phenoxyphosphazene compound includes a compound represented by the following formula (1):

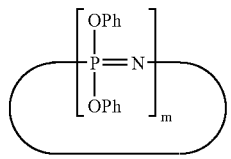

wherein m denotes an integer of 3 to 25, and Ph represents a phenyl group.

The linear phenoxyphosphazene compound includes a compound represented by the formula (2):

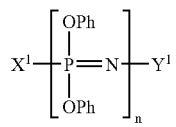

wherein $X^1$ represents the group —N=P(OPh)$_3$ or the group —N=P(O)OPh; $Y^1$ represents the group —P(OPh)$_4$ or the group —P(O)(OPh)$_2$; n denotes an integer of 3 to 10,000; and Ph has the same meaning as defined in the formula (1).

The crosslinked phenoxyphosphazene compound includes a compound which is formed by crosslinking at least one phenoxyphosphazene compound selected from the group consisting of the cyclic phenoxyphosphazene compound (1) and the linear phenoxyphosphazene compound (2) with a divalent crosslinking group. Incidentally, when a pair of phenoxyphosphazene compounds is crosslinked with the crosslinking group, the divalent crosslinking group is introduced in lieu of a pair of Ph groups.

The divalent crosslinking group includes a phenylene group (o-phenylene group, m-phenylene group, p-phenylene group), and a bisphenylene group represented by the following formula (3), and the like. Incidentally, the crosslinking group(s) may be used singly or in combination.

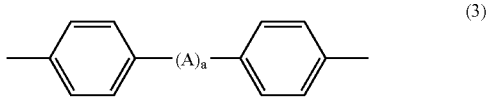

wherein A represents —C(CH$_3$)$_2$—, —SO$_2$—, —S— or —O—, and a denotes 0 or 1.

The amount of the phenyl group in the crosslinked phenoxyphosphazene compound is, based on the total phenyl groups in the phenoxyphosphazene compound (1) and/or the phosphazene compound (2), about 50 to 99.9 mol %.

Incidentally, the crosslinked phenoxyphosphazene compound is substantially free from a free hydroxyl group in a molecule thereof.

The cyclic and linear phenoxyphosphazene compounds represented by the formulae (1) and (2) can, for example, be synthesized by the method described in "Phosphorus-Nitrogen Compounds" by H. R. Allcock, published by Academic Press, (1972), "Inorganic Polymers" by J. E. Mark, H. R. Allcock, and R. West, published by Prentice-Hall International, Inc., (1992).

For example, a mixture of a compound of the formula (1) in which the group OPh is substituted by a chlorine atom (Cl) and m denotes an integer of 3 to 25 (a cyclic dichlorophosphazene oligomer), and a compound of the formula (2) in which the group OPh is substituted by a chlorine atom and n denotes an integer of 3 to 25 (a chain dichlorophosphazene oligomer) can be obtained by a reaction of phosphorus chloride (e.g., phosphorus trichloride, phosphorus pentachloride) and ammonium chloride, and if necessary a chlorine (in particular, in the case of using phosphorus trichloride as the phosphorus chloride) in a chlorine-series solvent (e.g., chlorobenzene, tetrachloroethane). The cyclic and linear phenoxyphosphazene compounds represented by the formulae (1) and (2) can be obtained by substituting a chlorine atom of the dichlorophosphazene oligomer mixture by phenol with use of an alkali metal phenolate (e.g., sodium phenolate).

The reaction temperature of phosphorus chloride and ammonium chloride is, for example, about 120 to 130° C.

If necessary, the mixture of the dichlorophosphazene oligomer may be subjected to purification (e.g., distillation, recrystallization) or polymerization (ring-opening-polymerization of a cyclic dichlorophosphazene oligomer). By purifying the mixture of the dichlorophosphazene oligomer, a single or sole compound of the cyclic dichlorophosphazene (e.g., hexachlorocyclotriphosphazene, octachlorocyclotetraphosphazene, decachlorocyclopentaphosphazene) can be obtained. Therefore, by substituting the single compound with a phenol, the cyclic phenoxyphosphazene compound such as hexaphenoxycyclotriphosphazene, octaphenoxycyclotetraphosphazene, and decaphenoxycyclopentaphosphazene can be obtained.

While, a cyclic dichlorophosphazene oligomer is ring-opening-polymerized to obtain a compound of the formula (2) in which the group OPh is substituted with a chlorine atom and n denotes an integer of 3 to 10,000. Therefore, by substituting the compound with a phenol, the linear phenoxyphosphazene compound represented by the formula (2) can be obtained.

The ring-opening-polymerization of the cyclic dichlorophosphazene oligomer can be carried out, for example, by heating to 220 to 250° C.

The crosslinked phenoxyphosphazene compound can be produced by substituting (crosslinking) a part of chlorine atoms with an alkali metal salt of an aromatic dihydroxy compound in lieu of by substituting all chlorine atoms of the dichlorophosphazene oligomer with an alkali metal phenolate in the production process of the cyclic phosphazene compound (1) or the linear phosphazene compound (2).

The dichlorophosphazene oligomer may be used as a mixture of the cyclic dichlorophosphazene oligomer and the linear dichlorophosphazene oligomer, or each may be used singly. An alkali metal salt of phenol and an alkali metal salt of an aromatic dihydroxy compound may be mixed and subjected to a reaction. After a reaction of the dichlorophosphazene oligomer with an alkali metal salt of phenol, an alkali metal salt of an aromatic dihydroxy compound may be reacted with the dichlorophosphazene oligomer. Moreover, the reaction may be carried out in its reverse order.

More preferably, a partial-substituted compound in which one part of chlorine atoms of the dichlorophosphazene compound is substituted with a phenol and one part thereof is substituted with an aromatic dihydroxy compound, and one part thereof is retained as chlorine atom, is obtained by reacting the dichlorophosphazene compound (e.g., a cyclic dichlorophosphazene oligomer, a linear dichlorophosphazene oligomer), an alkali metal salt of a phenol and an alkali metal salt of an aromatic dihydroxy compound (the first stage reaction). Then, the partial-substituted compound is reacted with an alkali metal salt of phenol (the second stage reaction) so that the crosslinked phenoxyphosphazene compound can be obtained. Thus the resulting crosslinked phenoxyphosphazene compound does not substantially contain a free hydroxyl group since all of hydroxyl groups of the aromatic dihydroxy compound are reacted with dichlorophosphazene compounds.

As the aromatic dihydroxy compound, use can be made of a compound having one or not less than two benzene ring(s) in its molecule and two hydroxyl groups, more concretely, a compound having the above crosslinking group (o-phenylene group, m-phenylene group, p-phenylene group, a group represented by the formula (3)). The preferred aromatic dihydroxy compound may include resorcinol, hydroquinone, catechol, a bisphenol [for example, a bis(4-hydroxyphenyl)alkane such as 4,4'-isopropylidenediphenol (bisphenol-A), 4,4'-sulfonyldiphenol (bisphenol-S), 4,4'-thiodiphenol, 4,4'-oxydiphenol, and 4,4'-diphenol]. The aromatic dihydroxy compound(s) may be used singly or in combination.

The alkali metal constituting the alkali metal salt includes sodium, potassium, lithium and the like. As the preferred alkali metal, there may be exemplified sodium and lithium.

In the first stage reaction, the total amount of the alkali metal salt of phenol and the alkali metal salt of an aromatic dihydroxy compound is usually about 0.05 to 0.9 equivalent, and preferably about 0.1 to 0.8 equivalent based on the chlorine content of the dichlorophosphazene oligomer. When the amount of the alkali metal salt is significantly less than 0.05 equivalent, the degree of crosslinking is insufficient. While, when the amount of the alkali metal salt is remarkably more than 0.9 equivalent, a free hydroxyl group (a hydroxyl group at one side of the dihydroxy compound) is introduced into the crosslinked phenoxyphosphazene compound.

The ratio of the alkali metal salt of the aromatic dihydroxy compound relative to the alkali metal salt of phenol is not particularly limited, can be suitably selected within a wide range, and the former/the latter is usually about 1/2000 to 1/4 (molar ratio). When the ratio is remarkably less than 1/2000, the degree of crosslinking is insufficient. While, when the ratio is dramatically more than 1/4, the crosslink proceeds too much, so that the solubility and meltability of the crosslinked phenoxyphosphazene compound are deteriorated and the dispersability in a resin is inadequate.

The first stage reaction may be carried out in a solvent (for example, an aromatic hydrocarbon such as toluene, a halogenated aromatic hydrocarbon such as chlorobenzene).

The reaction temperature of the first stage reaction is usually in a range from a room temperature to about 150° C.

In the second stage reaction, the amount of the alkali metal salt of phenol is usually about 1 to 1.5 equivalents, preferably about 1 to 1.2 equivalents based on the chlorine content of the dichlorophosphazene oligomer.

The chlorine content of the phosphazene compound is about not more than 2000 ppm (e.g., about 0 to 2000 ppm), preferably about 0 to 1500 ppm, and more preferably about 0 to 1000 ppm in the phosphazene compound.

The proportion of the phosphazene compound in the flame-retardant resin composition is, for example, 1 to 40% by weight, preferably about 1 to 30% by weight, and more preferably about 5 to 25% by weight. Moreover, the amount of the phosphazene compound is, for example, about 0.1 to 100 parts by weight, preferably about 1 to 80 parts by weight, and more preferably about 5 to 70 parts by weight relative to 100 parts by weight of the polyalkylene arylate-series resin. In the case where the amount of the phosphazene compound relative to the polyalkylene arylate-series resin is too large, the mechanical properties of the resin composition are deteriorated.

(Polyphenylene Oxide-series Resin)

The polyphenylene oxide-series resin (polyphenylene ether-series resin) includes a homopolymer and a copolymer. As the homopolymer, there may be mentioned a poly (mono-, di- or triC$_{1-6}$alkyl-phenylene)oxide such as a poly (2,6-dimethyl-1,4-phenylene)oxide, a poly(2,5-dimethyl-1, 4-phenylene)oxide, a poly(2,5-diethyl-1,4-phenylene)oxide, a poly(2-methyl-6-ethyl-1,4-phenylene)oxide, a poly(2,6-di-n-propyl-1,4-phenylene)oxide, a poly(2-ethyl-6-isopropyl-1,4-phenylene)oxide, a poly(2-methyl-6-methoxy-1,4-phenylene)oxide, a poly(2-methyl-6-hydroxyethyl-1,4-phenylene)oxide, a poly(2-methyl-6-chloroethyl-1,4-phenylene)oxide and a poly(2,3,6-trimethyl-1,4-phenylene) oxide; a poly(monoC$_{1-6}$alkyl-monoC$_{6-10}$aryl-phenylene) oxide such as a poly(2-methyl-6-phenyl-1,4-phenylene) oxide; a poly(mono- or diC$_{6-10}$aryl-phenylene)oxide such as a poly(2,6-diphenyl-1,4-phenylene)oxide; and others.

As the copolymer of the polyphenylene oxide, there may be mentioned a copolymer having not less than 2 of monomer units of the above homopolymers (for example, a random copolymer comprising 2,6-dimethyl-1,4-phenylene oxide unit and 2,3,6-trimethyl-1,4-phenylene oxide unit); a modified polyphenylene oxide copolymer which comprises an alkylphenol-modified (or alkylphenol-containing) benzene-formaldehyde resin block obtained by reaction of a benzene-formaldehyde resin (a formaldehyde condensate of a benzene ring-containing compound, such as a phenolic resin) or an alkylbenzene-formaldehyde resin with an alkylphenol (such as cresol, p-tert-butylphenol), and a polyphenylene oxide block as a main structure; a modified graft copolymer in which a styrenic compound and/or an acid anhydride is grafted to a polyphenylene oxide or a copolymer thereof; and others.

The intrinsic viscosity of the polyphenylene oxide-series resin is preferably about 0.2 to 0.8 dl/g, and more preferably about 0.25 to 0.7 dl/g, as a measured value at 30° C. in chloroform.

The polyphenylene oxide-series resin(s) may be used singly or in combination.

The amount of the polyphenylene oxide-series resin is about 10 to 500 parts by weight, preferably about 30 to 300 parts by weight, and more preferably about 50 to 200 parts by weight relative to 100 parts by weight of the phosphazene compound. Moreover, the amount of the polyphenylene oxide-series resin is about 0.1 to 100 parts by weight, preferably about 1 to 80 parts by weight, and more preferably about 5 to 70 parts by weight relative to 100 parts by weight of the polyalkylene arylate-series resin. In the case where the amount of the polyphenylene oxide-series resin relative to the polyalkylene arylate-series resin is too large, the mechanical properties of the resin composition are deteriorated.

(Styrenic Resin)

The styrenic resin includes a homo- or copolymer of an aromatic vinyl monomer, and a copolymer of an aromatic vinyl monomer and at least one selected from a vinyl cyanide monomer and a rubber component (for example, a copolymer of an aromatic vinyl monomer and a vinyl cyanide monomer, a graft copolymer obtained by graft-polymerization of an aromatic vinyl monomer to a rubber component, and a noncrystalline rubber-like polymer obtained by graft-polymerization of an aromatic vinyl monomer and a vinyl cyanide monomer to a rubber component).

Exemplified as the aromatic vinyl-series monomer is styrene, an alkylstyrene (e.g., a vinyltoluene such as o-, m-, or p-methylstyrene; a vinylxylene such as 2,4-dimethylstyrene; and an alkyl-substituted styrene such as ethylstyrene, p-isopropylstyrene, butylstyrene and p-t-butylstyrene), an α-alkyl-substituted styrene (e.g., α-methylstyrene, α-ethylstyrene, and α-methyl-p-methylstyrene), and the like. The styrenic monomer(s) may be used singly or in combination. Among others, the preferred styrenic monomer includes styrene, vinyltoluene, α-methylstyrene, and the like. In particular, styrene is preferred.

As the vinyl cyanide monomer, there may be mentioned, for example, (meth)acrylonitrile. The vinyl cyanide monomer(s) may be also used singly or in combination. The preferred vinyl cyanide monomer includes acrylonitrile.

The rubber component includes a conjugated diene-series rubber (e.g., a polybutadiene, a polyisoprene, a styrene-butadiene copolymer, an acrylonitrile-butadiene copolymer, and an ethylene-propylene-5-ethylidene-2-norbornene copolymer), an olefinic rubber [e.g., an ethylene-propylene rubber (EPDM rubber), an ethylene-vinyl acetate copolymer, and a halogenated polyolefin (such as a chlorinated polyethylene)], an acrylic rubber, and others. These rubber components may be hydrogenated. The rubber component(s) may be used singly or in combination. Among these rubber components, a conjugated diene-series rubber is preferred. Incidentally, the gel content of the rubber component such as the conjugated diene-series rubber is not limited at all. Moreover, the rubber component can be produced by a method such as emulsion polymerization, solution polymerization, suspension polymerization, bulk polymerization, solution-bulk polymerization, bulk-suspension polymerization, and others.

Further, the aromatic vinyl monomer may be used in combination with other copolymerizable monomer. The copolymerizable monomer includes, for example, a (meth) acrylic ester [e.g., a $C_{1-18}$alkyl ester of (meth)acrylic acid such as methyl (meth)acrylate, ethyl (meth)acrylate, butyl (meth)acrylate, t-butyl (meth)acrylate, hexyl (meth)acrylate, octyl (meth)acrylate and 2-ethylhexyl (meth)acrylate; a hydroxyl group-containing (meth)acrylate such as 2-hydroxyethyl (meth)acrylate and 2-hydroxypropyl (meth)acrylate; and glycidyl (meth)acrylate], a carboxyl group-containing monomer [e.g., an unsaturated monocarboxylic acid such as (meth)acrylic acid and crotonic acid; an aliphatic unsaturated dicarboxylic acid such as maleic anhydride, maleic acid, fumaric acid and itaconic acid; a monoester of an unsaturated dicarboxylic acid such as a monoester of maleic acid (a mono$C_{1-10}$alkyl ester of maleic acid such as monomethyl maleate, monoethyl maleate and monobutyl maleate) or a monoester of fumaric acid corresponding thereto, etc.], and a maleimide-series monomer (e.g., maleimide, an N-alkylmaleimide such as N-methylmaleimide, and N-phenylmaleimide). The copolymerizable monomer(s) may be used singly or in combination. The preferred copolymerizable monomer includes a (meth)acrylic ester (in particular, methyl methacrylate), (meth)acrylic acid, meleic anhydride, a maleimide-series monomer, and others.

In the case of using the vinyl cyanide monomer, the ratio (weight ratio) of the aromatic vinyl monomer relative to the vinyl cyanide monomer [aromatic vinyl monomer/vinyl cyanide monomer] is, for example, about 10/90 to 90/10, and preferably about 20/80 to 80/20.

In the case of using the rubber component, the ratio (weight ratio) of the rubber component relative to the aromatic vinyl monomer [rubber component/aromatic vinyl monomer] is about 5/95 to 80/20, and preferably about 10/90 to 70/30. The amount of the rubber component is too small, impact resistance of the resin composition is deteriorated. The amount of the rubber component is too large, dispersion becomes deteriorated so that the external appearance is apt to be impaired.

In the case of using other copolymerizable monomer, the ratio (weight ratio) of the aromatic vinyl monomer relative to other copolymerizable monomer [aromatic vinyl monomer/other copolymerizable monomer] is about 100/0 to 10/90, preferably about 90/10 to 10/90, and more preferably about 80/20 to 20/80.

The preferred styrenic resin includes a polystyrene (GPPS), an acrylonitrile-styrene copolymer (AS resin), a high impact polystyrene (HIPS), a graft polymer [for example, an acrylonitrile-butadiene-styrene copolymer (ABS resin), an acrylonitrile-acrylic rubber-styrene copolymer (AAS resin), an acrylonitrile-chlorinated polyethylene-styrene copolymer (ACS resin), an acrylonitrile-ethylene-propylene rubber-styrene copolymer (AES resin), an acrylonitrile-butadiene rubber-methyl methacrylate-styrene copolymer (ABSM resin), and methyl methacrylate-butadiene-styrene copolymer (MBS resin)], a block copolymer [for example, a styrene-butadiene-styrene (SBS) copolymer, a styrene-isoprene-styrene (SIS) copolymer, a styrene-ethylene-butylene-styrene (SEBS) copolymer, and a styrene-acrylonitrile-ethylene-propylene-ethylidene norbornene copolymer (AES)], or a hydrogenated product thereof. The particularly preferred styrenic resin includes a polystyrene (GPPS), a styrene-ethylene-butylene-styrene (SEBS) copolymer, an acrylonitrile-styrene copolymer (AS resin), an acrylonitrile-butadiene-styrene copolymer (ABS resin), and others. The styrenic resin(s) may be used singly or in combination.

The amount of the styrenic resin is about 0 to 100 parts by weight (e.g., about 0.1 to 100 parts by weight), preferably about 1 to 70 parts by weight, and more preferably about 5 to 50 parts by weight relative to 100 parts by weight of the phosphazene compound. Moreover, the amount of the styrenic resin is about 0.1 to 100 parts by weight, preferably about 1 to 50 parts by weight, and more preferably about 5 to 30 parts by weight relative to 100 parts by weight of the polyalkylene arylate-series resin. In the case where the amount of the styrenic resin relative to the polyalkylene arylate-series resin is too large, the mechanical properties of the resin composition is deteriorated.

(Nitrogen-containing Compound)

The nitrogen-containing compound preferably includes a nitrogen-containing cyclic compound. As the nitrogen-containing compound, there may be mentioned, for example, a salt of a nitrogen-containing cyclic compound having an amino group with a cyanuric acid or a derivative thereof, a salt of a nitrogen-containing cyclic compound having an amino group with an oxygen acid (oxyacid), a salt of a nitrogen-containing cyclic compound having an amino group with an organic phosphonic acid or an organic phosphinic acid [for example, a mono- to hexamelamine salt of nitrilotris(methylphosphonic acid) (a mono- to hexamelamine salt of [nitrilotris(methylene)]tris phosphonic acid), a mono- to tetramelamine salt of 1-hydroxyethylidene-1,1-diphosphonic acid; a melam salt, a melem salt, or a melamine-melam-melem double salt corresponding to the above-mentioned melamine salt], a urea compound (for example, acetyleneurea, a cyclic urea compound such as uric acid), and a polyphosphoric acid amide. Among them, a salt (a) of a nitrogen-containing cyclic compound having an amino group with a cyanuric acid or a derivative thereof, a salt (b) of a nitrogen-containing cyclic compound having an amino group with an oxygen acid (oxyacid) are particularly preferred.

As the nitrogen-containing cyclic compound having an amino group constituting the component (a), an amino group-containing triazine, in particular a 1,3,5-triazine is preferred. For example, there may be mentioned melamine, a melamine condensate (e.g., melam, melem, melon), and a guanamine (e.g., guanamine, methylguanamine, acetoguanamine, benzoguanamine, succinoguanamine, adipoguanamine). As a cyanuric acid or a derivative thereof, there may be exemplified cyanuric acid, isocyanuric acid, ammeline, ammelide, and the like. Concretely, the salt (a) of a nitrogen-containing cyclic compound having an amino group with a cyanuric acid includes a melamine salt of a cyanuric acid such as melamine cyanurate, a melam salt of a cyanuric acid, a melem salt of a cyanuric acid, a guanamine salt of a cyanuric acid, and the like. The proportion of the nitrogen-containing cyclic compound having an amino group relative to the cyanuric acid or the derivative thereof is not particularly limited, and for example, the former/the latter (molar ratio) is about 1/2 to 3/1, and more preferably about 1/1 to 2/1.

As the nitrogen-containing cyclic compound having an amino group to be used for the component (b), there may be used a nitrogen-containing cyclic compound similar to the above-mentioned component (a), and the like. The nitrogen-containing cyclic compound having an amino group is usually preferred to form a salt of at least one amino group which is a substituent of a ring with oxygen acid. In the case of having a plurality of amino groups, all amino groups may form a salt with oxygen acid. Moreover, a plurality of nitrogen-containing cyclic compounds which are the same or different kind (the above-mentioned nitrogen-containing cyclic compound, or other nitrogen-containing compound which contains an amino group) may form a salt with one polyacid to form a double salt of a polyacid. The oxygen acid includes a phosphoric acid (such as a non-condensed phosphoric acid and a condensed phosphoric acid), a sulfuric acid (e.g., a non-condensed sulfuric acid such as peroxomonosulfuric acid and sulfuric acid; a condensed sulfuric acid such as peroxodisulfuric acid and pyrosulfuric acid), a boric acid (e.g., a non-condensed boric acid, a condensed boric acid) and others. Among these oxygen acids, a phosphoric acid (e.g., phosphoric acid, triphosphoric acid, pyrophosphoric acid, polyphosphoric acid) and sulfuric acid are preferred. Specifically, the component (b) includes melamine phosphate, melamine pyrophosphate, melamine polyphosphate, melam polyphosphate, melem polyphosphate, a melamine.melam.melem double salt of polyphosphate, melamine sulfate, melam sulfate, melem sulfate, a melamine.melam.melem double salt of sulfuric acid, and others.

The nitrogen-containing compound(s) may be used singly or in combination.

The amount of the nitrogen-containing compound is about 0 to 300 parts by weight (e.g., about 5 to 300 parts by weight), preferably about 10 to 200 parts by weight, and more preferably about 20 to 150 parts by weight relative to 100 parts by weight of the phosphazene compound. The amount of the nitrogen-containing compound is about 0.1 to 50 parts by weight, preferably about 0.5 to 30 parts by weight, and more preferably about 1 to 20 parts by weight relative to 100 parts by weight of the polyalkylene arylate-series resin. In the case where the amount of the nitrogen-containing compound relative to the polyalkylene arylate-series resin is too large, the mechanical properties of the resin composition are deteriorated.

Since the flame retardant of the present invention comprises a polyphenylene oxide-series resin, the flame-retardancy can be imparted to the polyalkylene arylate-series resin with inhibiting the decline in a molecular weight and mechanical properties (e.g., strength, impact resistance) of the polyalkylene arylate-series resin. In particular, combination use of a phosphazene compound with a polyphenylene oxide-series resin, and if necessary a styrenic resin and/or a nitrogen-containing compound ensures impartment of higher flame retardancy to a polyalkylene arylate-series resin compared with use of a phosphazene compound alone. Moreover, since the flame retardant does not contain a halogen, there is no possibility that a hydrogen halide which is poisonous gas generates upon decomposition and burning, and that corrosion of a mould and deterioration of a resin occur upon molding the resin.

The proportion of the flame retardant (total amount of the phosphazene compound, the polyphenylene oxide-series resin, the styrenic resin, and the nitrogen-containing compound) in the resin composition is not particularly limited as far as properties of the polyalkylene arylate-series resin are not deteriorated, and is about 5 to 300 parts by weight, preferably about 10 to 200 parts by weight, and more preferably about 20 to 150 parts by weight of the flame retardant relative to 100 parts by weight of the polyalkylene arylate-series resin. When the amount of the flame retardant is too small, it is difficult that the flame-retardancy is imparted to the resin composition. When the amount of the flame retardant too large, mechanical strength and moldability of a shaped article obtained from the resin composition are deteriorated.

The polyalkylene arylate-series resin of the present invention may optionally comprise other flame retardant [for example, a phosphorus-series compound (phosphorus-containing compound), a carbonizable resin, an inorganic metal compound, a silicon-series compound (silicon-containing compound) (e.g., a zeolite, a (branched) silicone resin, a silicone oil), and a sulfur-series compound (sulfur-containing compound) (a metal salt of an alkyl- or aromatic sulfonic acid, a metal salt of a perfluoroalkylsulfonic acid, a salt of an alkanesulfonic acid with an amino group-containing triazine], an additive (e.g., a dripping inhibitor, an antioxidant, a releasing agent), and others.

[Other Flame Retardant]

Other flame retardant includes a phosphorus-series compound, a carbonizable resin, an inorganic metal compound, and the like. The other additive(s) may be used singly or in combination.

(Phosphorus-series Compound)

The phosphorus-series compound includes an organic phosphorus-series compound and an inorganic phosphorus-series compound. As the organic phosphorus-series compound, an aromatic phosphorus-series compound is preferred, and there may be mentioned, for example, an aromatic phosphoric ester (e.g., tricresyl phosphate, trixylyl phosphate), a condensed aromatic phosphoric ester [for example, a hydroquinone phosphate such as a hydroquinone bis(diphenyl phosphate) and a hydroquinone bis(dixylyl phosphate); a resorcinol phosphate such as a resorcinol bis(diphenyl phosphate), a resorcinol bis(dicresyl phosphate) and a resorcinol bis(dixylyl phosphate); a biphenol phosphate such as a biphenol bis(diphenyl phosphate), a biphenol bis(dicresyl phosphate) and a biphenol bis(dixylyl phosphate); a bisphenol-A phosphate such as a bisphenol-A bis(diphenyl phosphate), a bisphenol-A bis(dicresyl phosphate) and a bisphenol-A bis(dixylyl phosphate); and a phloroglucinol phosphate such as a phloroglucinol tris (diphenyl phosphate), a phloroglucinol tris(dicresyl phosphate) and a phloroglucinol tris(dixylyl phosphate)], an aromatic phosphinic ester (e.g., 9,10-dihydro-9-oxa-10-phosphaphenanthrene-10-oxide).

Moreover, as other preferred organic phosphorus-series compound, there may be also mentioned a metal salt of an organic phosphinic acid [for example, a metal salt (a polyvalent metal salt such as Mg, Ca, Ba, Zn, Al salt) of a di $C_{1-6}$alkylphosphinic acid, a $C_{1-6}$alkyl$C_{6-10}$arylphosphinic acid, a di$C_{6-10}$arylphosphinic acid and other phosphinic acid].

The inorganic phosphorus-series compound includes a red phosphorus which may be coated with a resin, a metal component or the like (e.g., a stabilized red phosphorus), a polyphosphate (a salt of a polyphosphoric acid) which may be coated with a resin, a metal component or the like (e.g., an ammonium polyphosphate), a metal salt of a phosphoric acid (or a phosphorous acid) (e.g., an alkaline earth metal salt of a phosphoric acid such as calcium phosphate), a metal hydrogenphosphate (e.g., an alkaline earth metal hydrogenphosphate such as calcium orthophosphate), and others.

The phosphorus-series compound(s) may be used singly or in combination.

(Carbonizable Resin)

The carbonizable resin includes a resin having an aromatic ring. As such the aromatic ring-containing resin, there may be exemplified a phenolic resin (for example, a novolak resin, an aralkyl resin, and a polyvinyl phenol-series resin), a polycarbonate-series resin, a polyarylate-series resin, an aromatic epoxy resin (e.g., a phenoxy resin), a polyphenylene sulfide-series resin, a polyetherimide-series resin. The carbonizable resin(s) may be used singly or in combination.

(1) Phenolic Resin (1-1) Novolak Resin

The novolak resin includes a phenol-novolak resin obtained by a reaction of a phenol [for example, phenol, a phenol having a $C_{1-20}$alkyl group (preferably a $C_{1-10}$alkyl group) as a substituent (e.g., cresol, xylenol, ethyl phenol, propyl phenol, butyl phenol, octyl phenol, nonyl phenol); cyanophenol; and an aryl phenol (e.g., phenyl phenol, benzyl phenol, cumyl phenol)] with an aldehyde (e.g., an aliphatic aldehyde such as formaldehyde, acetaldehyde, and propionaldehyde; an aromatic aldehyde such as benzaldehyde, and phenylacetaldehyde; in particular, formaldehyde). The phenol-novolak resin includes, for example, a random phenol-novolak resin which has random methylene bonds to a phenolic hydroxyl group, a high-ortho phenol-novolak resin which has many methylene bonds at ortho position to a phenolic hydroxyl group (e.g., a resin having the ratio ortho/para of not less than 1), and others. Among these phenol-novolak resins, a monomerless or dimerless resin having lower residual phenols is preferred. Moreover, the phenol-novolak resin also includes an aminotriazine-modified phenol-novolak resin which is modified or copolymerized with an aminotriazine (for example, melamine, guanamine, acetoguanamine, benzoguanamine). The novolak resin(s) may be used singly or in combination.

(1-2) Aralkyl Resin

As the aralkyl resin, there may be mentioned a phenol-aralkyl resin obtained by a reaction of an aralkyl [for example, p-xylylene glycol, a p-xylylene glycol $C_{1-4}$alkyl ether (e.g., p-xylylene glycol dimethyl ether, p-xylylene glycol dimethyl ether), an acyloxyaralkyl (e.g., p-xylylene-α,α'-diacetate), an aralkyldiol (e.g., p-xylylene-α,α'-diol), and an aralkylhalide (e.g., p-xylylene-α,α'-dichloride, p-xylylene-α,α'-dibromide)] with a phenol (e.g., the phenol or alkyl phenol exemplified in the section on the above-mentioned novolak resin), an aralkyl resin described in Japanese Patent Application Laid-Open No. 351822/2000 (JP-2000-351822A), and others. The aralkyl resin(s) may be used singly or in combination.

The phenol-aralkyl resin can be available as trade name "MILEX" (manufactured by Mitsui Chemicals, Inc.), "SUMILITE RESIN PR-54443" (manufactured by Sumitomo Durez Co., Ltd.), "Xylok" (manufactured by Albright & Wilson Corp.), "MEH7800" (manufactured by Meiwa Plastic Industries, Ltd.), or others.

(1-3) Polyvinylphenol-series Resin

The polyvinylphenol-series resin includes a homopolymer of an aromatic vinyl monomer having a hydroxyl group (for example, vinyl phenol, dihydroxystyrene), a copolymer of the above-mentioned aromatic vinyl monomer and other copolymerizable monomer [for example, a styrene such as styrene, vinyltoluene and α-methylstyrene; a (meth)acrylic acid or a derivative thereof (e.g., an ester, an acid amide) such as (meth)acrylic acid and (meth) acrylic ester, and (meth)acrylonitrile], and others.

The ratio (weight ratio) of the vinyl monomer relative to the copolymerizable monomer is, for example, about 10/90 to 100/0, preferably about 30/70 to 100/0, and more preferably about 40/60 to 100/0 (in particular about 50/50 to 100/0). The preferred polyvinylphenol includes a vinylphenol homopolymer (a polyhydroxystyrene), in particular a p-vinylphenol homopolymer.

Incidentally, the phenolic (phenol-series) resin also includes a modified phenolic resin in which part or all of phenolic hydroxyl groups of the phenolic resin are substituted into a functional group such as a glycidyl ether group, an acyl group (e.g., acetyl group), an aroyl group (e.g., benzoyl group, toluoyl group), an alkyl ether group, and an aryl ether group; a phenolic resin modified with a phosphorus-containing compound such as a phosphoric acid, a phosphorous acid, a phosphoric ester and a phosphite, a boric acid, and an inorganic metal salt.

The number average molecular weight of the phenolic resin is not particularly limited, and for example, may be selected within the range of about 300 to $50 \times 10^4$, preferably about 400 to $30 \times 10^4$, and more preferably about 500 to $5 \times 10^4$.

(2) Polycarbonate-series Resin

The polycarbonate-series resin includes a polymer obtainable by the reaction of a dihydroxy compound with phosgene or a carbonic ester such as diphenyl carbonate. The dihydroxy compound includes a bisphenol compound [for example, a bis(hydroxyaryl)$C_{1-6}$alkane such as bisphenol A, bisphenol F and bisphenol AD; a bis(hydroxyaryl)$C_{4-10}$cycloalkane; 4,4'-dihydroxydiphenyl ether; 4,4'-dihydroxydiphenyl sulfone; 4,4'-dihydroxydiphenyl sulfide; and 4,4'-dihydroxydiphenyl ketone], an alicyclic compound (for example, an alicyclic diol such as 1,4-cyclohexanediol, 1,4-cyclohexanedimethanol and a hydrogenated bisphenol A), and others. Incidentally, at least one of the dihydroxy compound and the carbonic ester is an aromatic compound.

The number average molecular weight of the polycarbonate-series resin is not particularly limited, and for example, may be selected within the range of about 300 to $50 \times 10^4$, preferably about 400 to $30 \times 10^4$, and more preferably about 500 to $5 \times 10^4$.

(3) Polyarylate-series Resin

The polyarylate-series resin can be obtained by a reaction of an aromatic polyol component with a polycarboxylic acid component (e.g., an aromatic polycarboxylic acid component). The polycarboxylic acid component usually contains at least an aromatic polycarboxylic acid component.

The aromatic polyol includes a benzenediol (e.g., resorcinol, hydroquinone, xylylene glycol), a bisphenol, for example, biphenol, a bis(hydroxyaryl)$C_{1-6}$alkane (e.g., bisphenol A, bisphenol F, bisphenol AD), and others.

Exemplified as the aromatic polycarboxylic acid component are, for example, a monocyclic aromatic dicarboxylic acid (in particular, a benzenedicarboxylic acid such as phthalic acid, isophthalic acid and terephthalic acid), a bis(carboxyaryl)$C_{1-6}$alkane, and the like.

The preferred polyarylate-series resin includes a polyarylate-series resin in which the aromatic polyol is a bisphenol, such as a polyester of a bisphenol (e.g., biphenol, bisphenol A, bisphenol AD, bisphenol F) with a benzenedicarboxylic acid (e.g., isophthalic acid, terephthalic acid), and a polyester of the bisphenol with a bis(arylcarboxylic acid) [e.g., a bis(carboxyaryl)$C_{1-4}$alkyl such as bis(carboxyphenyl) methane, bis(carboxyphenyl)ethane and bis(carboxyphenyl) propane].

Moreover, the polyarylate-series resin may constitute a polymer alloy with a resin other than the polyarylate-series resin, such as a polyester-series resin (e.g., PET), a polycarbonate-series resin, a polyamide-series resin, or the like.

The number average molecular weight of the polyarylate-series resin is, for example, about 300 to $30 \times 10^4$, preferably about 500 to $10 \times 10^4$, and more preferably about 500 to $5 \times 10^4$.

(4) Aromatic Epoxy Resin

Examples of the aromatic epoxy resin include a glycidyl ether-series epoxy resin (for example, a biphenol-based epoxy resin, a bisphenol-based epoxy resin, a novolak-based epoxy resin), a glycidyl ester-series epoxy resin, a glycidylamine-series epoxy resin containing an aromatic amine component, and others.

As the bisphenol-based epoxy resin, there may be mentioned, for example, a glycidyl ether of a bis(hydroxyaryl) $C_{1-6}$alkane, particularly bisphenol A, bisphenol AD, bisphenol F and the like. Moreover, the bisphenol-based epoxy resin includes the above-mentioned bisphenol glycidyl ether having high molecular weight (that is, a phenoxy resin). The novolak-based epoxy resin includes, for example, a glycidyl ether of a novolak resin in which an alkyl group (e.g., a $C_{1-20}$alkyl group, preferably a $C_{1-4}$alkyl group such as methyl group and ethyl group) may be substituted on the aromatic ring (e.g., a phenol-novolak resin, a cresol-novolak resin).

The number average molecular weight of the aromatic epoxy resin is, for example, about 200 to 50,000, preferably about 300 to 10,000, and more preferably about 400 to 6,000 (e.g., about 400 to 5,000). Moreover, the number average molecular weight of the phenoxy resin is, for example, about 500 to 50,000, preferably 1,000 to 40,000, and more preferably about 3,000 to 35,000.

(Inorganic Metal Compound)

As the inorganic compound, there may be exemplified a metal hydroxide (e.g., magnesium hydroxide, aluminum hydroxide), a metal borate (e.g., hydrous zinc borate, hydrous calcium borate), a metal stannate (e.g., hydrous zinc stannate), a metal sulfate, a metal oxide (e.g., molybdenum oxide, tungstic oxide, antimony oxide, zirconium oxide), a metal sulfide (e.g., zinc sulfide, molybdenum sulfide, tungstic sulfide), and others. The inorganic metal compound(s) may be used singly or in combination.

The amount of other flame retardant is about 0 to 100 parts by weight, preferably about 0 to 80 parts by weight, and more preferably about 1 to 60 parts by weight relative to 100 parts by weight of the polyalkylene arylate-series resin.

[Additive]

The additive includes an antioxidant, a heat stabilizer (thermostabilizer), a dripping inhibitor, a releasing agent, a filler, and others. The additive(s) may be used singly or in combination.

(Antioxidant)

The antioxidant includes a hindered phenol-series antioxidant [e.g., a branched $C_{3-6}$alkylphenol such as 2,6-di-t-butyl-p-cresol, 2,2'-methylenebis(4-methyl-6-t-butylphenol), 2,2'-thiobis(4-methyl-6-t-butylphenol), 4,4'-thiobis(6-t-butyl-m-cresol), and pentaerythritol-tetrakis(3-(3,5-di-t-butyl-4-hydroxyphenyl)propionate)]; an amine-series antioxidant (e.g., a hindered amine such as naphthylamine, phenylnaphthylamine, and 1,4-phenylenediamine); a phosphorus-series antioxidant [for example, a phosphite (e.g., a bis($C_{1-9}$alkyl-aryl)pentaerythritol diphosphite such as bis(2, 4-di-t-butylphenyl)pentaerythritol diphosphite, and bis(2,6-di-t-butyl-4-methylphenyl)pentaerythritol diphosphite), and a phosphonite (e.g., tetrakis(2,4-di-t-butylphenyl)-4,4'-biphenylene diphosphonite, 10-decyloxy-9,10-dihydro-9-oxa-10-phosphaphenanthrene)]; and others. The antioxidant(s) may be used singly or in combination.

(Heat Stabilizer)

The heat stabilizer includes an inorganic phosphorus-series stabilizer, for example, a phosphoric acid, a phosphorous acid, a pyrophosphoric acid, a tripolyphosphoric acid, an acidic alkali metal salt of a phosphoric acid (such as sodium dihydrogenphosphate), an acidic alkaline earth metal salt of a phosphoric acid (such as calcium dihydrogenphosphate, calcium dihydrogenpyrophosphate), and others. The heat stabilizer(s) may be used singly or in combination.

(Dripping Inhibitor)

The dripping inhibitor includes a fluorine-containing resin such as a homo- or copolymer of a fluorine-containing monomer and a copolymer of a fluorine-containing monomer and other copolymerizable monomer, a layered silicate, and others. Concretely, as such a fluorine-containing resin, there may be exemplified a polytetrafluoroethylene, a polychlorotrifluoroethylene, a polyvinylidene fluoride, a tetrafluoroethylene-hexafluoropropylene copolymer, a tetrafluoroethylene-perfluoroalkylvinyl ether copolymer, an ethylene-tetrafluoroethylene copolymer, an ethylene-chlorotrifluoroethylene copolymer, and others. The dripping inhibitor(s) may be used singly or in combination.

(Releasing Agent)

The releasing agent includes a wax (for example, a $C_{1-4}$olefinic wax such as a polyethylene wax, a ethylene copolymer wax and a polypropylene wax), a salt of a higher fatty acid (for example, a metal salt of a higher fatty acid such as an alkali metal salt of a $C_{8-35}$ fatty acid), an ester of a higher fatty acid (for example, an alkyl ester of a higher fatty acid such as an alkyl ester of a $C_{8-35}$ fatty acid), a higher fatty acid amide (for example, a $C_{8-35}$ fatty acid amide, an alkylene bis fatty acid amide), a silicone-series compound (for example, a silicone oil, a silicone resin), and others. The releasing agent(s) may be used singly or in combination.

(Filler)

As the filler, there may be exemplified a fibrous filler (e.g., a glass fiber, a carbon fiber), a particulate filler (e.g., a silicate such as a kaolin and a talc; a metal carbonate such as calcium carbonate; a metal oxide such as titanium oxide), a plate-like filler (e.g., a mica, a glass flake, a variety of metal foil), and others. Among these fillers, the fibrous filler, in particular the glass fiber (e.g., a chopped strand) is preferred from the viewpoint of having high strength and rigidity. The filler(s) may be used singly or in combination.

The filler may be used in combination with a sizing agent or surface-treatment agent. Such a sizing agent or surface-treatment agent includes a functional compound. As the functional compound, there may be mentioned, for example, an epoxy-series compound, a silane-series compound, and a titanate-series compound.

Moreover, if necessary, the resin composition of the present invention may comprise other additive, for example, a nucleating agent, a lubricant, a plasticizer, a flame-retardant synergist (flame-retardant auxiliary), a stabilizer (a ultraviolet ray absorbing agent, a heat stabilizer), a coloring agent (a pigment, a dye), an antistatic agent, a dispersing agent, an antibacterial agent, and others.

The amount of each additive is, for example, about 0.01 to 20 parts by weight, and preferably about 0.01 to 10 parts by weight relative to 100 parts by weight of the polyalkylene arylate-series resin. Further, among the additives, the filler is about 5 to 60% by weight, preferably about 5 to 50% by weight, and more preferably about 5 to 45% by weight (in particular about 5 to 40% by weight) in the flame-retardant resin composition.

[Production Process of Flame-retardant Resin Composition]

The flame-retardant resin composition of the present invention may be a particulate mixture or a molten mixture, and it can be prepared by mixing a polyalkylene arylate-series resin, a flame retardant, and if necessary, an additive(s) in a conventional manner.

The resin composition of the present invention can be shaped by melt-kneading, and molding of a conventional manner such as an extrusion molding, an injection molding and a compression molding. Thus shaped article is excellent in flame retardancy and molding processability (mold-processability), and can be utilized for various purposes. For example, the shaped article can be suitably utilized for electric or electronic device parts, mechanical device parts, automotive parts, and others.

INDUSTRIAL APPLICABILITY

According to the present invention, use of a flame retardant comprising a specific phosphazene compound, a polyphenylene oxide-series resin, and if necessary a styrenic resin and/or a nitrogen-containing compound in combination can impart flame retardancy to the polyalkylene arylate-series resin without using a halogen-series flame retardant. In particular, according to the present invention, high flame retardancy to the polyalkylene arylate-series resin can be improved without deteriorating properties of the polyalkylene arylate-series resin. Further, use of the specific phosphazene compound drastically improves moldability (inhibition of mold deposit), suppression of bleeding out of a flame retardant from a shaped article, and metal corrosion.

EXAMPLES

The following examples are intended to describe this invention in further detail and should by no means be interpreted as defining the scope of the invention.

In Examples and Comparative Examples, flame retardancy of the resin composition was evaluated by the following tests. Moreover, in Examples and Comparative Examples, the following polyester resins, flame retardants (phosphazene compounds, polyphenylene oxide-series resins, styrenic resins, nitrogen-containing compound), and if necessary, other flame retardants (phosphorus-series compounds, carbonizable resins, and inorganic metal compounds), additives (antioxidants, heat stabilizers, dripping inhibitors, releasing agents), or fillers were employed.

[Flammability Test]

In accordance with UL94, flame retardancy was evaluated using a test piece 1.6 mm thick.

[Evaluation of Bleeding Out of Flame Retardant (Blooming Properties)]

A test piece for flame retardant evaluation was put in a Geer oven, and allowed to stand at 150° C. for 10 hours to give a molded piece. Then, bleeding (blooming) state of the flame retardant was graded according to the following five ranks by visually observing the surface of the resultant molded piece.

"A": none
"B": slight bleeding out
"C": moderate bleeding out
"D": much bleeding out
"E": excessive bleeding out

[Metal Corrosion]

A pellet composition (100 g) prepared by extrusion and a silver plate (1×1 cm) were put in a 500 ml glass bottle with ground-in stopper, the bottle was stoppled and allowed to stand at 120° C. for 72 hours. Then, metal corrosion of the silver plate was visually observed, and was evaluated based on the following criteria.

"A": no change
"B": corroded

[Moldability (the Amount of the Deposit on the Mold)]

A pellet formed with a flame-retardant resin composition was continuously or successively shaped or molded (500 shots) by using a 30 ton injection molding machine to obtain a predetermined shaped article (size: diameter 20 mm×thickness 1 mm), and the degree of the deposition on the mold (mold deposit) was evaluated and classified into five levels. Incidentally, the smaller the number of the levels is, the lower or smaller the amount of the deposit (i.e., mold deposit) is.

[Polyalkylene terephthalate A]

A-1: Polybutylene terephthalate [DURANEX, intrinsic viscosity=1.0, manufactured by Polyplastics Co., Ltd.]
A-2: Polybutylene terephthalate [DURANEX, intrinsic viscosity=0.75, manufactured by Polyplastics Co., Ltd.]
A-3: polyethylene terephthalate [BELLPET EFG10, manufactured by Kanebo, Ltd.]
A-4: Polybutylene terephthalate modified with isophthalic acid in 12.5 mole % thereof [intrinsic viscosity=1.0]

[Phosphazene Compound B]
B-1 to B-3: Crosslinked phenoxyphosphazene compounds obtained from Synthesis Examples 1 to 3 mentioned below
B'-1: Cyclic phosphazene compound (Hexachlorocyclotriphosphazene was reacted with phenol in tetrahydrofuran in the presence of triethylamine, then the reaction solution was concentrated under a reduced pressure, and the residue was washed with water to give the object phosphazene compound), chlorine content: not less than 2000 ppm

[Polyphenylene Oxide-series Resin C]
C-1: Poly(2,6-dimethyl-1,4-phenylene)oxide [PPE polymer YPX-100F, manufactured by Mitsubishi Gas Chemical Company, Inc.]

[Styrenic Resin D]
D-1: Polystyrene [TOYO STYROL GP G200C, manufactured by Toyo Styrene Co., Ltd.]
D-2: Acrylonitrile-styrene copolymer [DIAPET, AS AP-10, manufactured by Mitsubishi Rayon Co., Ltd.]

[Nitrogen-containing Compound E]
E-1: Melamine cyanurate [MC610, manufactured by Nissan Chemical Industries, Ltd.]
E-2: Melamine polyphosphate [PMP100, manufactured by Nissan Chemical Industries, Ltd.]
E-3: Melam polyphosphate [PMP200, manufactured by Nissan Chemical Industries, Ltd.]

[Other Flame Retardant F]

(Carbonizable Resin F1)
F1-1: Polycarbonate [PANLITE L1225, manufactured by Teijin Chemicals Ltd.]
F1-2: Polyarylate [Polyarylate U Polymer U8400, manufactured by Unitika Ltd.]
F1-3: Bisphenol A-based epoxy resin [EPIKOTE 1004K, manufactured by Yuka Shell Epoxy K.K.]
F1-4: Phenol-novolak-based epoxy resin [EPPN, manufactured by Nippon Kayaku Co., Ltd.]
F1-5: Bisphenol A-based epoxy resin [EPIKOTE 828, manufactured by Yuka Shell Epoxy K.K.]

(Inorganic Metal Compound F2)
F2-1: Magnesium hydroxide [KISUMA 5E, manufactured by Kyowa Chemical Industry Co., Ltd.]
F2-2: Hydrous zinc borate [Fire Brake ZB, manufactured by US Borax Inc.]
F2-3: Hydrous calcium borate [UB Powder, manufactured by Kinsei Matec Co., Ltd.]
F2-4: Anhydrous calcium monohydrogenphosphate [manufactured by Taihei Chemical Industrial Co., Ltd.]

(Phosphorus-series Compound F3)
F3-1: Resorcinol bis(di-2,6-xylylphosphate) [PX200, manufactured by Daihachi Chemical Industry Co., Ltd.]
F3-2: Aluminum salt of ethylmethylphosphinic acid

[Antioxidant/Heat Stabilizer G]
G-1: Pentaerythritol-tetrakis[3-(3,5-di-t-butyl-4-hydroxyphenyl)propionate] [IRGANOX 1010, manufactured by Ciba-Geigy Ltd.]
G-2: Bis(2,6-di-t-butyl-4-methylphenyl) pentaerythritol diphosphite [ADEKASTAB PEP36, manufactured by Adeka Argus Chemical Co., Ltd.]
G-3: Tetrakis(2,4-di-t-butylphenyl)-4,4'-biphenylene diphosphonite [SANDOSTAB P-EPQ, manufactured by Sandoz.]
G-4: calcium dihydrogenphosphate

[Dripping Inhibitor H]
H-1: Polytetrafluoroethylene

[Releasing Agent I]
I-1: Pentaerythritol tetrastearate [UNISTAR, manufactured by NOF Corp.]
I-2: Montanic acid ester [LUZA WAX, manufactured by Toyo-Petrolite Co., Ltd.]
I-3: Polyethylene wax [SANWAX, manufactured by Sanyo Chemical Industries, Ltd.]

[Filler J]
J-1: Glass fiber [chopped strand having 10 μm in diameter and 3 mm long]
J-2: Glass fiber [chopped strand having 13 μm in diameter and 3 mm long]
J-3: Talc [TALC 3A, manufactured by Nippon Talc Co., Ltd.]

Synthesis Example 1

Synthesis of a Phenoxyphosphazene Compound (B-1) Having a Crosslinked Structure Via 4,4'-sulfonyldiphenylene (bisphenol-S Residue)

In a 1 L four-neck flask containing 0.4 mol (37.6 g) of phenol and 500 mL of THF was charged 0.4 gram atom (9.2 g) of a shredded metal sodium under stirring with maintaining the internal temperature of 25° C. After charging the metal sodium, the mixture was stirred for 5 hours at 65 to 72° C. until complete disappearance of the metal sodium was observed.

Concurrently with the above reaction, in a 1 L four-neck flask containing 1.70 mol (160.0 g) of phenol, 0.05 mol (12.5 g) of bisphenol-S and 500 mL of tetrahydrofuran (THF) was charged 1.8 gram atom (41.4 g) of metal sodium at a temperature of not higher than 25° C. After the metal sodium was charged, the mixture was heated up to 61° C. by taking one hour, and the reaction was continued with stirring the mixture at 61 to 68° C. for 6 hours to prepare a sodium phenolate mixed solution. The resultant solution was added dropwise to 20% by weight conc. chlorobenzene solution (580 g) containing 1.0 unit mol (115.9 g) of a dichlorophosphazene oligomer (a mixture of trimer (62% by weight), tetramer (12% by weight), pentamer and hexamer (total 11% by weight), heptamer (3% by weight), and octamer or more (total 12% by weight)) under stirring with cooling to a temperature of not higher than 25° C., and the reaction was carried out at 71 to 73° C. for 5 hours. Then, the above sodium phenolate mixed solution prepared in advance was added dropwise thereto, and the reaction was carried on at 71 to 73° C. for 3 hours.

After the reaction was completed, the reaction mixture was concentrated, and the concentrate was redissolved to 500 mL of chlorobenzene. The resultant was washed with an aqueous solution containing 5 wt. % NaOH three times, with 5 wt. % sulfuric acid, with an aqueous solution containing 5 wt. % sodium bicarbonate, and with water three times, and was concentrated to dryness to give a light-yellow wax-like product (218 g).

In the crosslinked phenoxyphosphazene compound obtained above, the residual chlorine was not more than 0.01% by weight, and the composition of the product was identified as almost $[N=P(-O-Ph-SO_2-Ph-O-)_{0.05}(-O-Ph)_{1.90}]$ on the basis of the phosphorus content thereof and CHN elemental analysis thereof. The weight-average molecular weight (Mw) was 1080 in terms of polystyrene. The TG/DTA analysis showed that the melting temperature was 103° C., the initial decomposition temperature was 320° C., and the temperature at which the weight of the product showed a 5% decrease was 334° C. Moreover, the amount of the residual hydroxyl group was determined as not more than detection limit (not more than $1\times10^6$ equivalence/g as equivalent weight of the hydroxyl group per gram of the sample) by an acetylation method.

Synthesis Example 2

Synthesis of a Phenoxyphosphazene Compound (B-2) Having a Structure Crosslinked Via metaphenylene A mixture containing 1.1 mol (103.5 g) of phenol, 1.1 mol (44.0 g) of sodium hydroxide, 50 g of water, and 500 mL of toluene was refluxed with heating to remove only water therefrom, thus preparing a toluene solution containing sodium phenolate.

Concurrently with the above reaction, a mixture of 0.15 mol (16.5 g) of resorcinol, 1.0 mol (94.1 g) of phenol, 1.3 mol (31.1 g) of lithium hydroxide, 52 g of water, and 600 mL of toluene was refluxed with heating in a 2 L four-neck flask to remove only water therefrom, thus preparing a toluene solution containing resorcinol and lithium salt of phenol. To the toluene solution was added dropwise 20% by weight conc. chlorobenzene solution (580 g) containing 1.0 unit mol (115.9 g) of a dichlorophosphazene oligomer (a mixture of trimer (62% by weight), tetramer (12% by weight), pentamer and hexamer (total 11% by weight), heptamer (3% by weight), and octamer or more (total 12% by weight)) at a temperature of not higher than 30° C. with stirring, and the resultant mixture was subjected to a reaction at 110° C. for 3 hours with stirring. The above toluene solution containing sodium phenolate was added to the reaction mixture, and the reaction was followed through on at 110° C. for 4 hours.

After the reaction was completed, the reaction mixture was washed with 1.0 L of an aqueous solution containing 3 wt. % sodium hydroxide three times, then washed with 1.0 L of water three times. Thereafter, the generated organic layer was concentrated under a reduced pressure. The resultant product was subjected to a vacuum drying with heating at 80° C. under a pressure of not higher than 400 Pa for 11 hours to give a white powder (209 g).

In thus obtained crosslinked phenoxyphosphazene compound, the residual chlorine was 0.08% by weight, the weight-average molecular weight (Mw) was 1080 in terms of polystyrene (based on GPC analysis), the composition of the final product was identified as $[N=(—O-m-Ph-O)_{0.15}(—O-Ph)_{1.7}]$ in the basis of the phosphorus content thereof and CHN elemental analysis thereof. The TG/DTA analysis of the product showed that the melting temperature was unclear, the initial decomposition temperature thereof was 304° C., and the temperature at which the weight of the product showed a 5% decrease was 311° C. Moreover, the amount of the residual hydroxyl group was determined as not more than detection limit (not more than $1\times10^6$ equivalence/g as equivalent weight of the hydroxyl group per gram of the sample) by an acetylation method.

Synthesis Example 3

Synthesis of a Phenoxyphosphazene Compound (B-3) Having a Crosslinked Structure Via 2,2-bis(p-oxyphenyl)isopropylidene Group)

In a 1 L four-neck flask containing 0.7 mol (65.9 g) of phenol and 500 mL of toluene was charged 0.65 gram atom (14.9 g) of a shredded metal sodium under stirring with maintaining the internal temperature of 25° C. After charging the metal sodium, the mixture was stirred for 8 hours at 77 to 113° C. until complete disappearance of the metal sodium was observed.

Concurrently with the above reaction, in a 3 L four-neck flask containing 0.25 mol (57.1 g) of bisphenol-A, 1.1 mol (103.5 g) of phenol and 800 mL of tetrahydrofuran (THF) was charged 1.6 gram atom (11.1 g) of a shredded metal lithium under stirring with maintaining the internal temperature of not higher than 25° C. After the metal lithium was charged, the mixture was stirred for 8 hours at 61 to 68° C. until complete disappearance of the metal lithium was observed. To the resultant slurry solution was added dropwise 1.0 unit mol (115.9 g) of a dichlorophosphazene oligomer (concentration: 37% by weight, chlorobenzene solution: 313 g, composition: a mixture of trimer (75% by weight), tetramer (17% by weight), pentamer and hexamer (total 6% by weight), heptamer (1% by weight), and octamer or more (total 1% by weight)) for one hour under stirring with maintaining the internal temperature of not higher than 20° C., and the resultant mixture was subjected to a reaction at 80° C. for 2 hours. Then, the sodium phenolate solution which was separately prepared was added to the reaction solution for one hour under stirring with maintaining the internal temperature of 20° C., and the resultant mixture was subjected to a reaction at 80° C. for 5 hours.

After the reaction was completed, the reaction mixture was concentrated to remove THF, and another toluene (1 L) was added to the mixture. The toluene solution was washed with 1 L of an aqueous solution containing 2 wt. % NaOH three times, and then washed with 1 L of water three times. Thereafter, the generated organic layer was concentrated under a reduced pressure. Thus obtained product was subjected to a vacuum drying with heating at 80° C. under a pressure of not higher than 400 Pa for 11 hours to give a white powder (229 g).

In the crosslinked phenoxyphosphazene compound obtained above, the residual chlorine was 0.07% by weight, and the composition of the final product was identified as $[N=P(—O-Ph-C(CH_3)_2-Ph-O—)_{0.25}(—O-Ph)_{1.50}]$ in the basis of the phosphorus content thereof and CHN elemental analysis thereof. The weight-average molecular weight (Mw) was 1130 in terms of polystyrene (based on GPC analysis). The TG/DTA analysis of the product showed that the melting temperature was unclear, the initial decomposition temperature was 308° C., and the temperature at which the weight of the product showed a 5% decrease was 313° C. Moreover, the amount of the residual hydroxyl group was determined as not more than detection limit (not more than $1\times10^{-6}$ equivalence/g as equivalent weight of the hydroxyl group per gram of the sample) by an acetylation method.

Examples 1 to 16 and Comparative Examples 1 to 10

With the polyalkylene terephthalate A was mixed the phosphazene compound B, the polyphenylene oxide-series resin C, the styrenic resin D, the nitrogen-containing compound E, other flame retardant F, the antioxidant/heat stabilizer G, the dripping inhibitor H, the releasing agent I, the filler J, and others in a proportion described in Tables 1 to 3, and the mixture was extruded with a 30 mmΦ biaxial extruder [TEX 30, manufactured by Japan Steel Works, Ltd.] at 280° C. to give a composition. The polyalkylene terephthalate resin composition was subjected to an injection molding with a 50 ton molding machine to form a shaped article for a flammability test, and the flammability of the test piece 1.6 mm thick was evaluated. Further, the bleeding out of flame retardant, metal corrosion, and moldability were evaluated. The resultants were shown in Tables 1 to 3.

TABLE 1

|  | Examples | | | | | | | | | |
| --- | --- | --- | --- | --- | --- | --- | --- | --- | --- | --- |
|  | 1 | 2 | 3 | 4 | 5 | 6 | 7 | 8 | 9 | 10 |
| Polyalkylene terephthalate A | A-1 | A-2 A-3 | A-2 A-3 | A-2 | A-2 | A-3 | A-3 | A-3 | A-2 A-3 | A-2 A-3 |
| parts by weight | 100 | 70 30 | 70 30 | 100 | 100 | 100 | 100 | 100 | 70 30 | 70 30 |
| Phosphazene compound B | B-1 | B-1 | B-1 | B-1 | B-1 | B-1 | B-1 | B-1 | B-2 | B-3 |
| parts by weight | 35 | 50 | 50 | 50 | 25 | 50 | 40 | 40 | 50 | 50 |
| Polyphenylene oxide-series resin C | C-1 | C-1 | C-1 | C-1 | C-1 | C-1 | C-1 | C-1 | C-1 | C-1 |
| parts by weight | 45 | 40 | 40 | 40 | 40 | 40 | 40 | 40 | 40 | 40 |
| Styrenic resin D | — | D-1 | D-1 | D-1 | D-1 | D-1 | D-1 | D-2 | D-1 | D-1 |
| parts by weight |  | 13 | 13 | 13 | 13 | 13 | 13 | 13 | 13 | 13 |
| Nitrogen-containing compound E | — | E-1 E-2 | E-1 E-3 | E-1 | E-1 | E-1 | E-1 | E-1 | E-1 E-3 | E-1 E-3 |
| parts by weight |  | 17 7 | 17 7 | 17 | 17 | 17 | 17 | 15 | 17 7 | 17 7 |
| Other flame retardant F | — | — | F1-1 | F2-1 | F3-1 | — | F2-2 | F1-2 | — | — |
| parts by weight |  |  | 7 | 7 | 25 |  | 5 | 7 |  |  |
| Antioxidant/Heat stabilizer G | G-1 | G-1 G-2 | G-1 G-3 | G-1 G-2 | G-1 | G-1 | G-1 | G-1 G-4 | G-1 G-4 | G-1 G-4 |
| parts by weight | 0.5 | 0.5 1.0 | 0.5 1.0 | 0.5 1.0 | 0.5 | 0.5 | 0.5 | 0.5 0.1 | 0.5 0.1 | 0.5 0.1 |
| Dripping inhibitor H | — | H-1 | H-1 | H-1 | H-1 | H-1 | H-1 | H-1 | H-1 | H-1 |
| parts by weight |  | 1.5 | 1.5 | 1.5 | 1.5 | 1.5 | 1.5 | 1.5 | 1.5 | 1.5 |
| Releasing agent I | — | I-1 | I-2 | I-1 | I-2 | I-1 | I-2 | I-3 | I-2 | I-2 |
| parts by weight |  | 2.0 | 1.5 | 2.0 | 1.5 | 2.0 | 1.5 | 3.0 | 1.5 | 1.5 |
| Filler J | — | J-1 | J-1 | J-1 | J-2 | J-2 | J-2 | J-2 | J-2 | J-2 |
| parts by weight |  | 100 | 100 | 100 | 100 | 100 | 100 | 100 | 100 | 100 |
| UL94 flammability test | V-2 | V-0 | V-0 | V-1 | V-0 | V-0 | V-0 | V-0 | V-0 | V-0 |
| Blooming | A | A | A | A | A | A | A | A | A | A |
| Metal corrosion | A | A | A | A | A | A | A | A | A | A |
| Mold deposit | 1 | 2 | 2 | 2 | 2 | 2 | 2 | 2 | 2 | 2 |

TABLE 2

|  | Examples | | | | | |
| --- | --- | --- | --- | --- | --- | --- |
|  | 11 | 12 | 13 | 14 | 15 | 16 |
| Polyalkylene terephthalate A | A-1 | A-4 | A-3 | A-3 | A-1 | A-1 |
| parts by weight | 100 | 100 | 100 | 100 | 100 | 100 |
| Phosphazene compound B | B-1 | B-1 | B-1 | B-1 | B-1 | B-1 |
| parts by weight | 50 | 50 | 30 | 20 | 50 | 50 |
| Polyphenylene oxide-series resin C | C-1 | C-1 | C-1 | C-1 | C-1 | C-1 |
| parts by weight | 40 | 40 | 20 | 20 | 35 | 35 |
| Styrenic resin D | D-1 | D-1 | D-1 | D-1 | — | — |
| parts by weight | 13 | 13 | 8 | 8 |  |  |
| Nitrogen-containing compound E | E-1 | E-1 | E-1 | E-3 | E-3 | E-1 |
| parts by weight | 17 | 17 | 10 | 10 | 5 | 5 |
| Other flame retardant F | F1-3 F2-3 | F1-4 F2-4 | F1-3 F2-3 | F1-5 F3-1 | F1-1 F1-3 | F1-1 F3-2 |
| parts by weight | 7 7 | 7 7 | 5 5 | 5 5 | 25 5 | 25 5 |
| Antioxidant/Heat stabilizer G | G-1 G-2 | G-1 G-2 | G-1 G-2 | G-1 G-2 | G-1 G-3 | G-1 G-3 |
| parts by weight | 0.5 1.0 | 0.5 1.0 | 0.5 1.0 | 0.5 1.0 | 0.5 1.0 | 0.5 1.0 |
| Dripping inhibitor H | H-1 | H-1 | H-1 | H-1 | H-1 | H-1 |
| parts by weight | 1.5 | 1.5 | 1.0 | 1.0 | 1.5 | 1.5 |
| Releasing agent I | I-2 | I-2 | I-2 | I-2 | I-2 | I-2 |
| parts by weight | 1.5 | 1.5 | 1.0 | 1.0 | 1.5 | 1.5 |
| Filler J | J-1 | J-1 | J-1 J-3 | J-1 J-3 | J-1 | J-1 |
| parts by weight | 100 | 100 | 80 8 | 80 8 | 100 | 100 |
| UL94 flammability test | V-0 | V-0 | V-0 | V-0 | V-0 | V-0 |
| Blooming | A | A | A | A | A | A |
| Metal corrosion | A | A | A | A | A | A |
| Mold deposit | 2 | 2 | 2 | 1 | 1 | 1 |

TABLE 3

|  | Comparative Examples | | | | | | | | | |
| --- | --- | --- | --- | --- | --- | --- | --- | --- | --- | --- |
|  | 1 | 2 | 3 | 4 | 5 | 6 | 7 | 8 | 9 | 10 |
| Polyalkylene terephthalate A | A-1 | A-2 A-3 | A-2 A-3 | A-2 | A-2 | A-2 | A-2 | A-3 | A-1 | A-1 |
| parts by weight | 100 | 70 30 | 70 30 | 100 | 100 | 100 | 100 | 100 | 100 | 100 |
| Phosphazene compound B | — | — | — | B-1 | — | — | — | B'-1 | B'-1 | B'-1 |
| parts by weight |  |  |  | 30 |  |  |  | 35 | 30 | 50 |
| Polyphenylene oxide-series resin C | C-1 | C-1 | C-1 | — | C-1 | C-1 | C-1 | C-1 | — | C-1 |
| parts by weight | 45 | 40 | 40 |  | 40 | 40 | 40 | 45 |  | 35 |

TABLE 3-continued

| | Comparative Examples | | | | | | | | | |
|---|---|---|---|---|---|---|---|---|---|---|
| | 1 | 2 | 3 | 4 | 5 | 6 | 7 | 8 | 9 | 10 |
| Styrenic resin D | — | D-1 | D-1 | — | D-1 | D-1 | D-1 | — | — | — |
| parts by weight | | 13 | 13 | | 13 | 13 | 13 | | | |
| Nitrogen-containing compound E | — | — | E-1  E-2 | — | — | E-1 | — | — | — | E-1 |
| parts by weight | | | 17    7 | | | 17 | | | | 5 |
| Other flame retardant F | — | — | — | — | — | F2-1 | — | — | — | F1-1 |
| parts by weight | | | | | | 7 | | | | 25 |
| Antioxidant/Heat stabilizer G | G-1 | G-1  G-2 | G-1  G-2 | G-1  G-2 | G-1  G-2 | G-1  G-2 | G-1 | G-1 | G-1  G-2 | — |
| parts by weight | 0.5 | 0.5   1.0 | 0.5   1.0 | 0.3   0.5 | 0.5   1.0 | 0.5   1.0 | 0.5 | 0.5 | 0.3   0.5 | |
| Dripping inhibitor H | — | H-1 | H-1 | H-1 | H-1 | H-1 | H-1 | — | H-1 | H-1 |
| parts by weight | | 1.5 | 1.5 | 1.0 | 1.5 | 1.5 | 1.5 | | 1.0 | 1.5 |
| Releasing agent I | — | — | — | — | — | — | — | — | — | — |
| parts by weight | | | | | | | | | | |
| Filler J | — | J-1 | J-1 | J-1 | J-1 | J-1 | J-2 | — | J-1 | J-1 |
| parts by weight | | 100 | 100 | 60 | 100 | 100 | 100 | | 60 | 100 |
| UL94 flammability test | HB | HB | HB | HB | HB | HB | HB | HB | HB | V-1 |
| Blooming | A | A | A | D | A | A | A | C | E | C |
| Metal corrosion | A | A | A | A | A | A | A | B | B | B |
| Mold deposit | 1 | 1 | 4 | 2 | 1 | 3 | 1 | 3 | 5 | 4 |

As apparent from Tables 1 to 3, the polyalkylene terephthalates of Examples show high flame-retardancy.

The invention claimed is:

1. A flame-retardant resin composition comprising a flame retardant and a polyalkylene arylate-series resin, in which the flame retardant comprises a phosphazene compound, a polyphenylene oxide-series resin, a nitrogen-containing compound and a styrenic resin, wherein the phosphazene compound comprises at least a crosslinked phenoxyphosphazene compound in which at least one phenoxyphosphazene compound selected from the group consisting of a cyclic phenoxyphosphazene compound represented by the following formula (1) and a linear phenoxyphosphazene compound represented by the following formula (2) is crosslinked with the following crosslinking group:

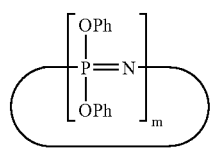  (1)

wherein m denotes an integer of 3 to 25, and Ph represents a phenyl group;

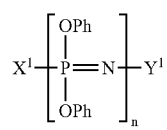  (2)

wherein $X^1$ represents the group —N=P(OPh)$_3$ or the group —N=P(O)OPh, $Y^1$ represents the group —P(OPh)$_4$ or the group —P(O)(OPh)$_2$, n denotes an integer of 3 to 10,000, and Ph has the same meaning as defined in the formula (1); and the crosslinking group comprising at least one member selected from the group consisting of o-phenylene group, m-phenylene group, p-phenylene group, and a bisphenylene group represented by the formula (3)

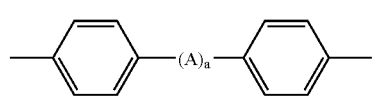  (3)

wherein A represents —C(CH$_3$)$_2$—, —SO$_2$—, —S— or —O—, and a denotes 0 or 1; and wherein the crosslinking group is bonded to two oxygen atoms with elimination of phenyl groups of the phenoxyphosphazene compound(s), and the content of the phenyl group of the crosslinked compound is, based on the total phenyl groups in at least one phosphazene compound selected from the group consisting of the phosphazene compounds (1) and (2), 50 to 99.9 mol%, and the crosslinked phenoxyphosphazene compound is free from a free hydroxyl group; and wherein the amount of the polyphenylene oxide-series resin is 0.1 to 100 parts by weight relative to 100 parts by weight of the polyalkylene arylate-series resin; and the styrenic resin comprises at least one member selected from the group consisting of a homopolymer of at least one aromatic vinyl monomer selected from the group consisting of styrene, an alkyl-styrene and an α-alkyl-substituted styrene and a copolymer of the aromatic vinyl monomer and at least one member selected from the group consisting of a vinyl cyanide monomer and a rubber component.

2. A composition according to claim 1, wherein the phosphazene compound further comprises at least one member selected from the group consisting of the cyclic phenoxyphosphazene compound (1) and the linear phenoxyphosphazene compound (2).

3. A composition according to claim 1, wherein the polyalkylene arylate-series resin comprises at least one member selected from the group consisting of a polyethylene terephthalate-series resin and a polybutylene terephthalate-series resin.

4. A composition according to claim 1, wherein the amount of the flame retardant is 5 to 300 parts by weight relative to 100 parts by weight of the polyalkylene arylate-series resin.

5. A composition according to claim 1, wherein the flame retardant comprises 10 to 500 parts by weight of the polyphenylene oxide-series resin, 0.1 to 100 parts by weight of the styrenic resin and 5 to 300 parts by weight of the nitrogen-containing compound, relative to 100 parts by weight of the phosphazene compound.

6. A composition according to claim 1, wherein the flame retardant further comprises at least one member selected from the group consisting of a phosphorus-series compound, a polycarbonate-series resin, a polyacrylate-series resin, an aromatic epoxy resin, a polyphenylene sulfide-series resin, a polyetherimide-series resin and an inorganic metal compound.

7. A composition according to claim 1, which further comprises at least one member selected from the group consisting of an antioxidant, a dripping inhibitor, a releasing agent, and a filler.

8. A flame-retardant resin composition according to claim 1, wherein the polyalkylene arylate-series resin comprises a polyalkylene terephthalate-series resin, and wherein the amount of the flame retardant is 10 to 200 parts by weight relative to 100 parts by weight of the polyalkylene terephthalate-series resin, and the flame retardant comprises 30 to 300 parts by weight of the polyphenylene oxide-series resin, 0.1 to 100 parts by weight of the styrenic resin and 5 to 300 parts by weight of the nitrogen-containing compound, relative to 100 parts by weight of the phosphazene compound.

9. A process for producing a flame-retardant resin composition, which comprises mixing a polyalkylene arylate-series resin with a flame retardant recited in claim 1.

10. A shaped article formed with a composition recited in claim 1.

* * * * *